INVENTORS
Linden A. Thatcher
John A. Strother
BY Edwin H. Owen
ATTORNEY

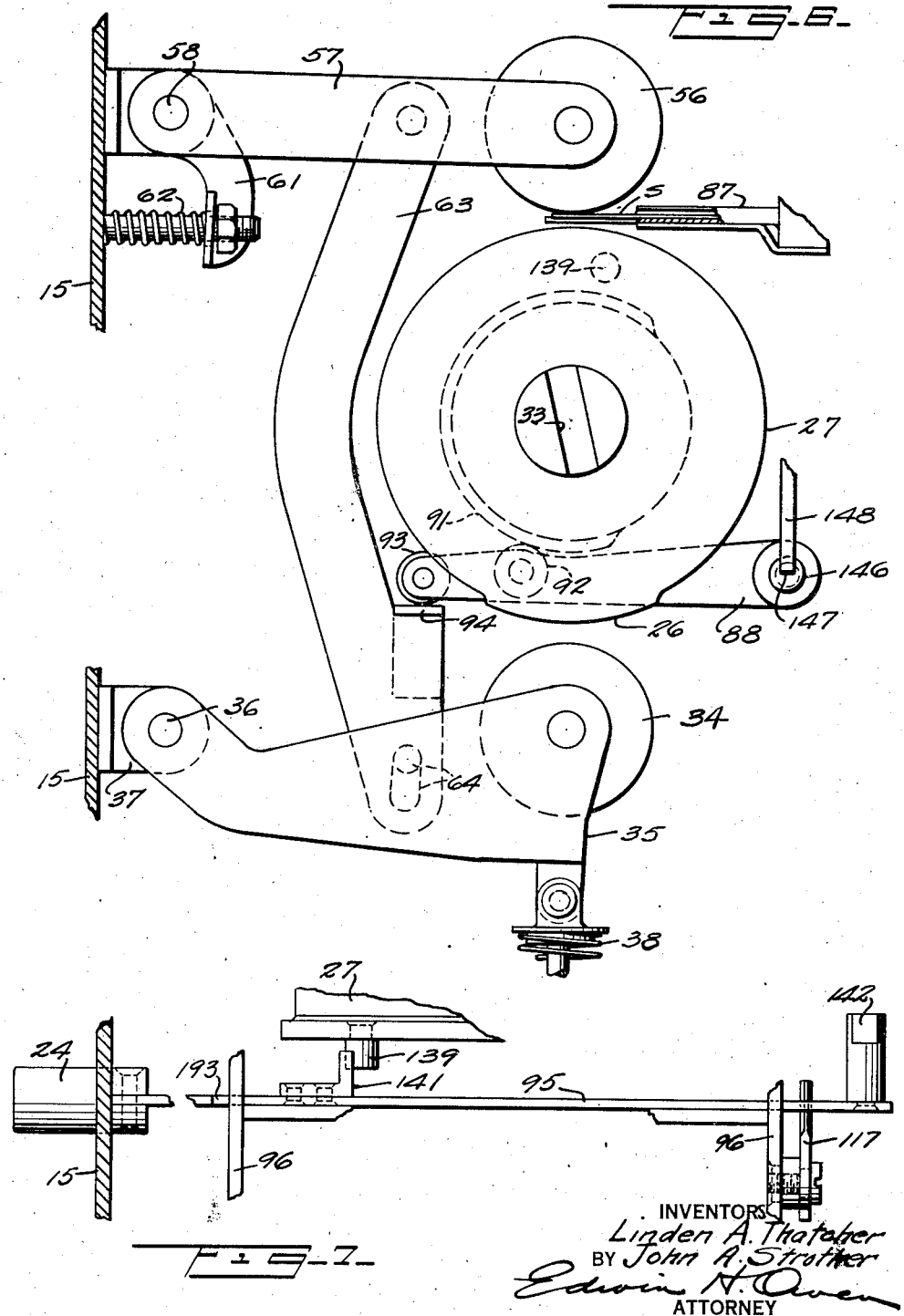

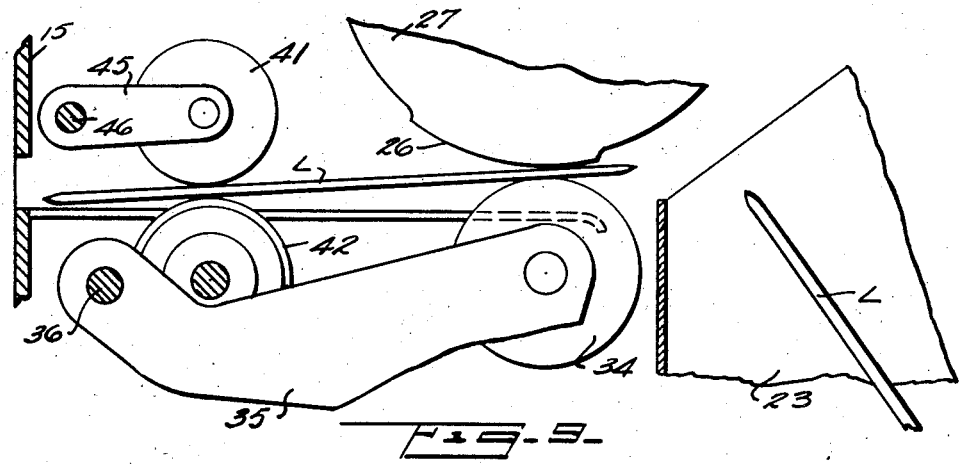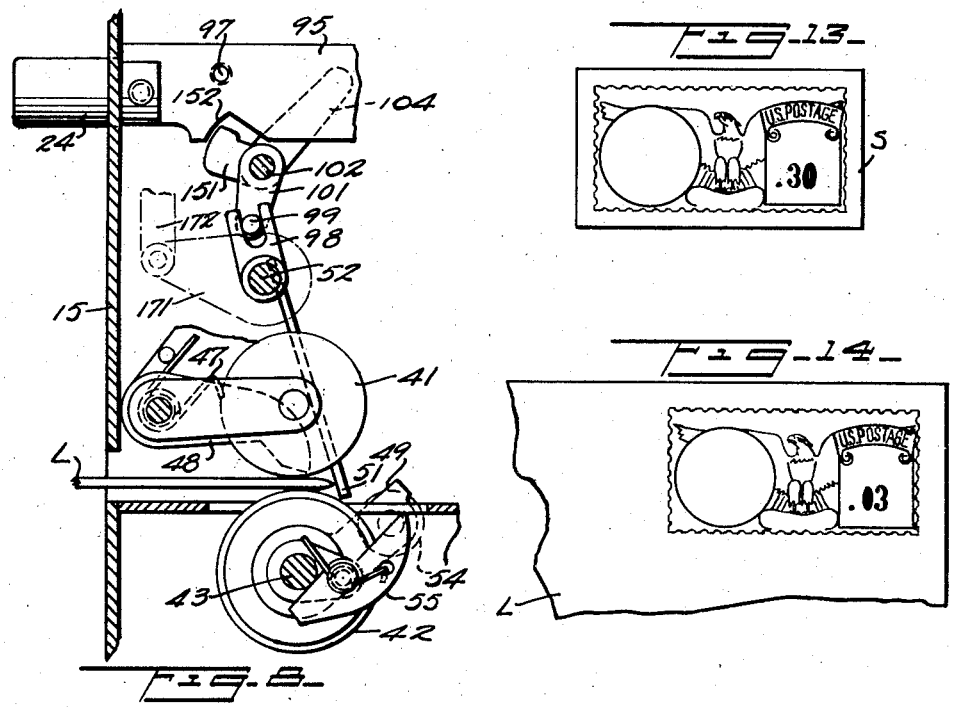

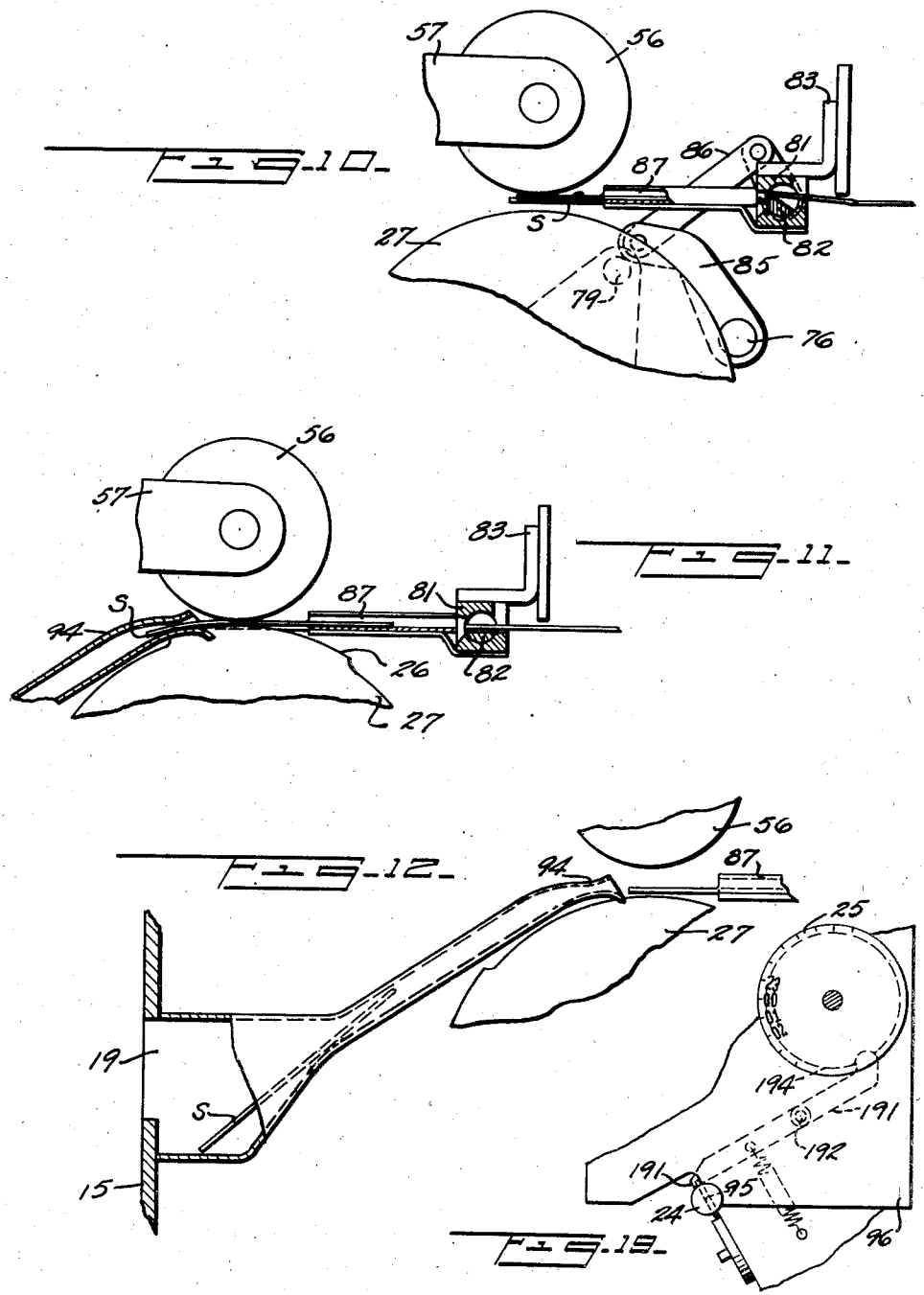

Feb. 17, 1942.   L. A. THATCHER ET AL   2,273,300
LETTER AND TAPE PRINTER
Filed Jan. 16, 1940   8 Sheets-Sheet 8
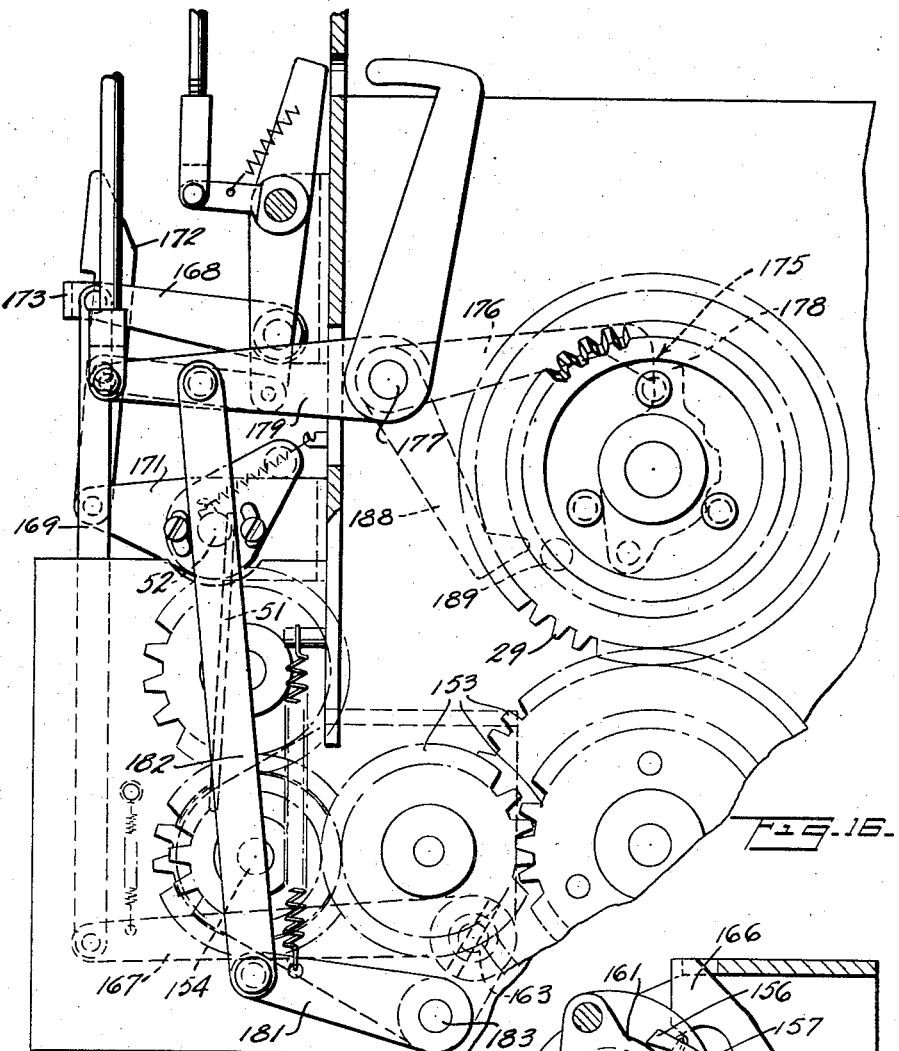
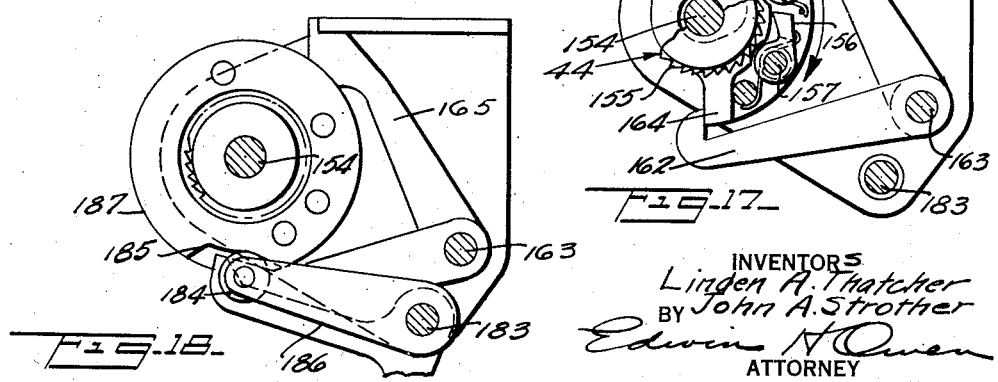
INVENTORS
Linden A. Thatcher
BY John A. Strother
Edwin H. Owen
ATTORNEY Patented Feb. 17, 1942

2,273,300

UNITED STATES PATENT OFFICE 2,273,300

LETTER AND TAPE PRINTER

Linden A. Thatcher and John A. Strother, Stamford, Conn., assignors to Pitney-Bowes Postage Meter Co., Stamford, Conn., a corporation of Delaware Application January 16, 1940, Serial No. 314,038

8 Claims. (Cl. 101—235)

This invention relates to a mailing machine which is adapted to print a stamp impression upon letters and tape and is a continuation in part of a pending patent application, Serial No. 271,848.

In the machine disclosed in the said pending application, which is a coin operated mailing machine, provision is made for the printing of letters only. While this provides for a large variety of sizes of letters, there are occasions when letters are presented to the machine which are larger than the letter slot in the machine casing in which they are to be inserted. To provide for the printing of oversize pieces of mail, also parcel-post packages, a tape printing and issuing device has been provided which will function under the control of the operator, to issue a printed stamp. The stamp preferably has one gummed surface and when moistened can be easily applied to the oversize mail or package.

Several novel features are presented in the combination provided, and while the disclosure is more particularly related to a coin operated mailing machine, it is to be understood that the features claimed will apply to any form of mailing or like printing machines.

Among the several objects of this invention, one object is to provide in a coin operated mailing machine, means whereby tape and separate pieces of matter may be imprinted with a stamp impression.

It is a further object to provide individual tripping means for alternatively effecting the operation of the machine for the printing of stamp impressions on letters or tape, thereby eliminating the necessity for any pre-selection means.

Another object of the invention is to provide means whereby, with a single rotary printing die, printing upon letters will be effected in a direction which will cause letters to move inward from a position outside the machine, and printing upon tape will be effected in a direction which will cause the tape to move outward in an opposite direction from a position within the machine.

Another object of the invention is to provide a platen roller at each of two printing positions, and to provide means whereby the platen roller which is associated with the article to be printed upon, will be the only one disposed in a printing position.

Another object is to provide means for printing on either separate pieces of matter or tape, and means whereby the printing on one will prevent the printing on the other.

Another object is to provide a tape supply including means to feed tape to the printing member, and means to cut the tape before printing is effected.

It is a further object to prevent the tripping of the machine for either a tape or letter printing operation until a value selection is made.

With the above and other objects in view, which will appear as the description proceeds, the invention resides in the combination and arrangement of parts and in the details of construction hereinafter described and claimed, it being understood that various changes in the precise embodiment of the invention herein disclosed may be made within the scope of what is claimed without departing from the spirit of the invention.

A preferred embodiment of the invention is illustrated in the accompanying drawings, wherein:

Fig. 6 is a detailed view of part of the mechanism shown in Fig. 2, and more particularly the two platen rollers which are associated with the two printing positions and with the upper or tape platen roller shown in a printing position;

Fig. 7 is a plan detailed view of the push button bar shown in the position of Fig. 2;

Fig. 8 is an operation view showing a letter tripping operation and the locking of the tape control push button;

Fig. 9 is an operation view showing a letter passing through a printing position and further showing another letter being deposited in a letter receptacle;

Fig. 10 is an operation view showing a tape cutting operation;

Fig. 11 is an operation view showing the printing of the tape;

Fig. 12 is an operation view showing the ejection of the tape after printing;

Fig. 13 is a face view of the printed stamp on tape;

Fig. 14 is a face view of the printed stamp on a portion of a letter;

Fig. 15 is a plan detail view of the tape guide and cutting member;

Fig. 16 is a detail elevational view looking in the direction of the arrow 16 on Fig. 3;

Fig. 17 is a detail view looking in the direction of the arrow 17 on Fig. 3;

Fig. 18 is a detail view looking in the direction of the arrow 18 on Fig. 3; and Fig. 19 is a detail view showing the value selector dial and cam means to control the latching of the tape control push button.

Figure 1:
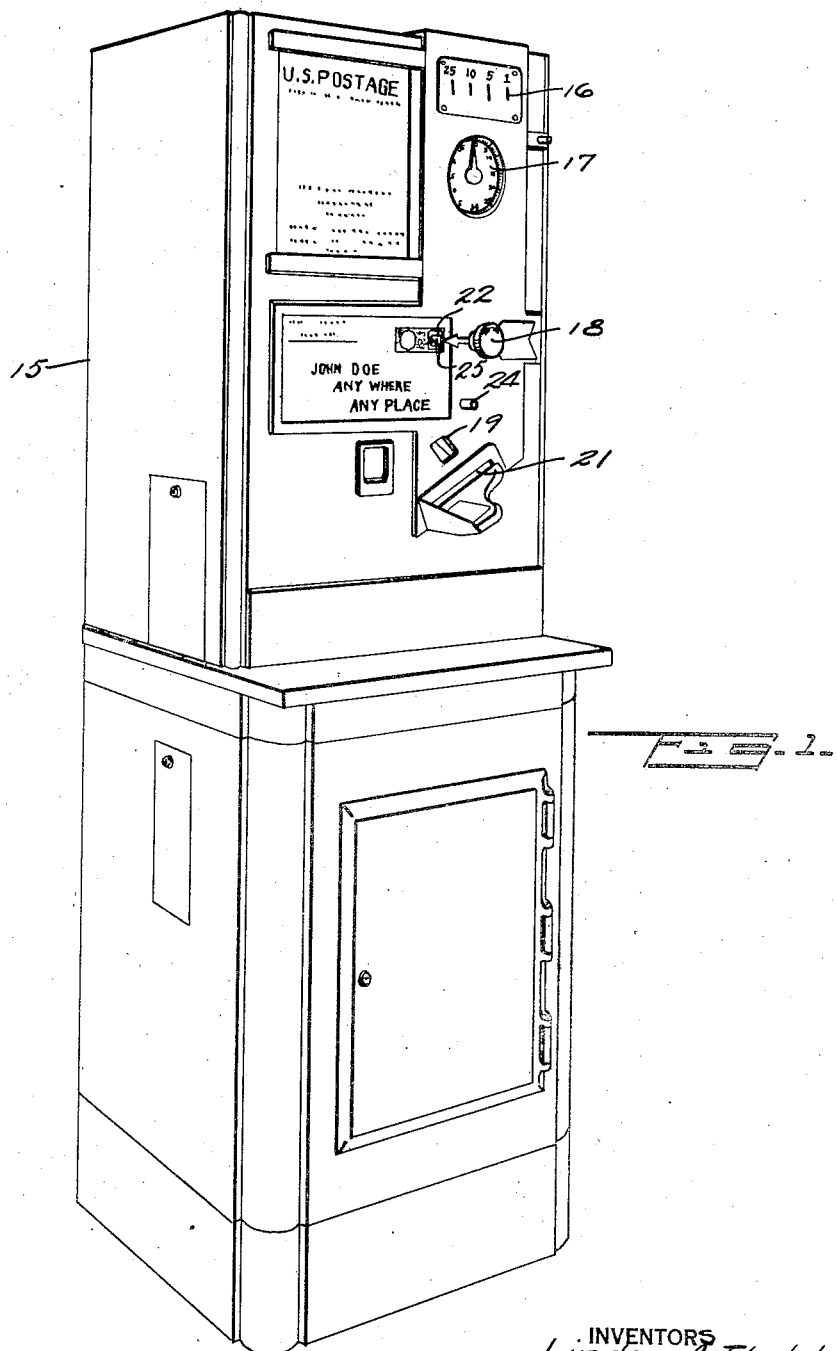
Fig. 1 is a perspective view looking toward the front and one side of the casing which encloses the mailing machine.

Referring now to the drawings in detail, Fig. 1 illustrates the outer structure of the machine or housing 15 which includes within the upper portion thereof, the credit and printing mechanisms, and within the lower portion, a mail receptacle. Within the front panel of the housing are coin slots 16, a credit indicator dial 17, a selector knob 18 and selector dial 25, a tape or stamp receptacle 19, and a letter slot 21.

The machine in general provides for the reception of coins of a plurality of denominations, which, when inserted, will effect the setting of a credit for the total unit value thereof, which credit will register upon the dial 17. Selection of any desired value of stamped impression is made by rotating the knob 18 until said value appears on the dial 25 within the window 22. Having made such selection, the mechanism within the machine will have been properly adjusted, and the value printing dies 26 will have been set in printing position in accordance with said selection.

If the operator has a letter on which said stamp value is to be printed, the letter is inserted within the slot 21. This will effect the tripping of the machine, in a manner to be hereinafter described, and will cause the letter to be drawn into the machine to be printed and then be directed into the letter receptacle, a portion of which is indicated at 23, Fig. 9. If the operator chooses to print the stamp impression upon tape, a push button 24 is depressed. This trips the machine and effects a tape feeding, cutting and printing operation of the tape and finally deposits the printed and cut portion in the receptacle 19.

Figure 2:
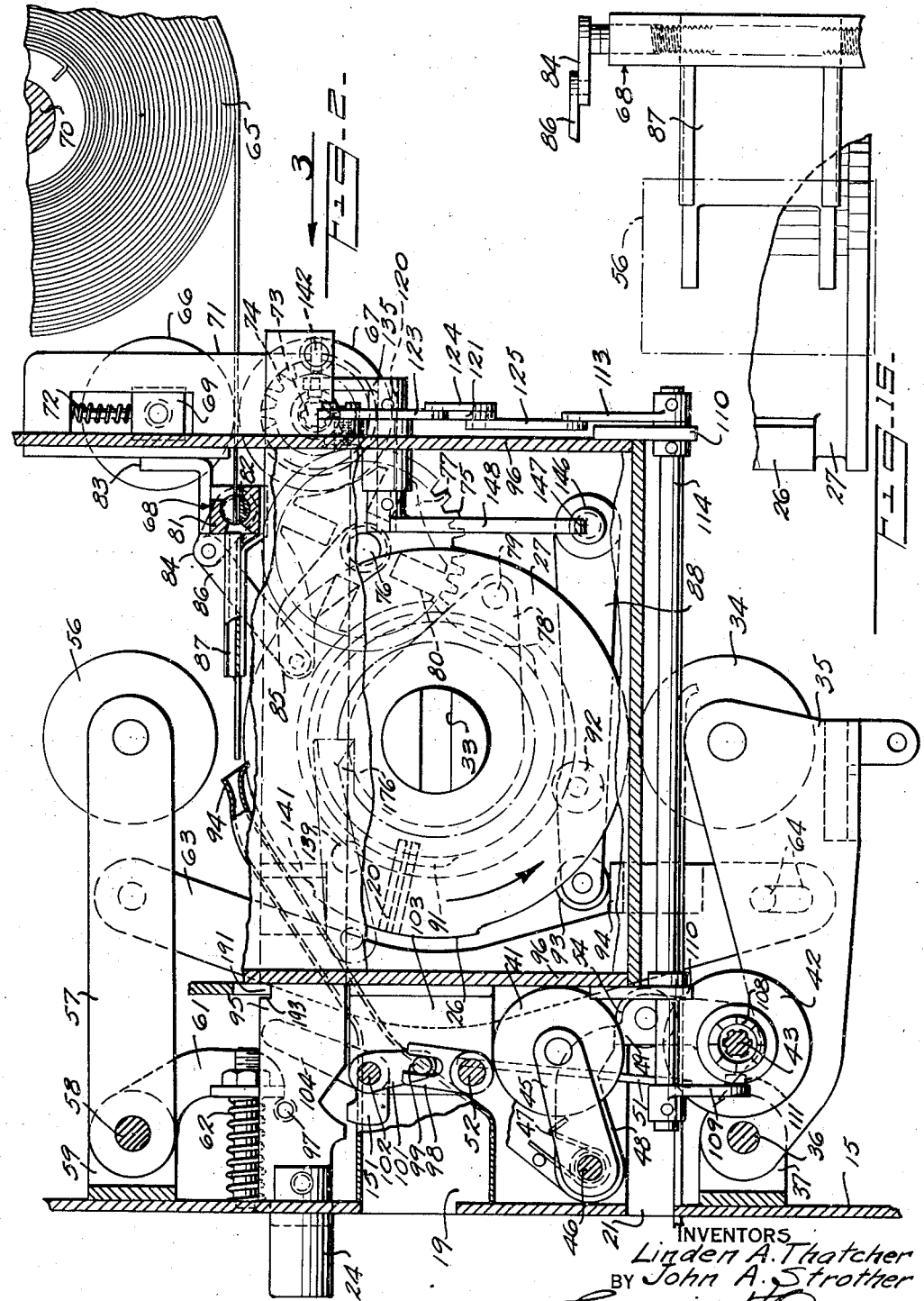
Fig. 2 is a vertical sectional view through a portion of the machine and includes the letter and tape printing mechanism, tape supply and cutting mechanisms, and control means therefor.
Figure 3:
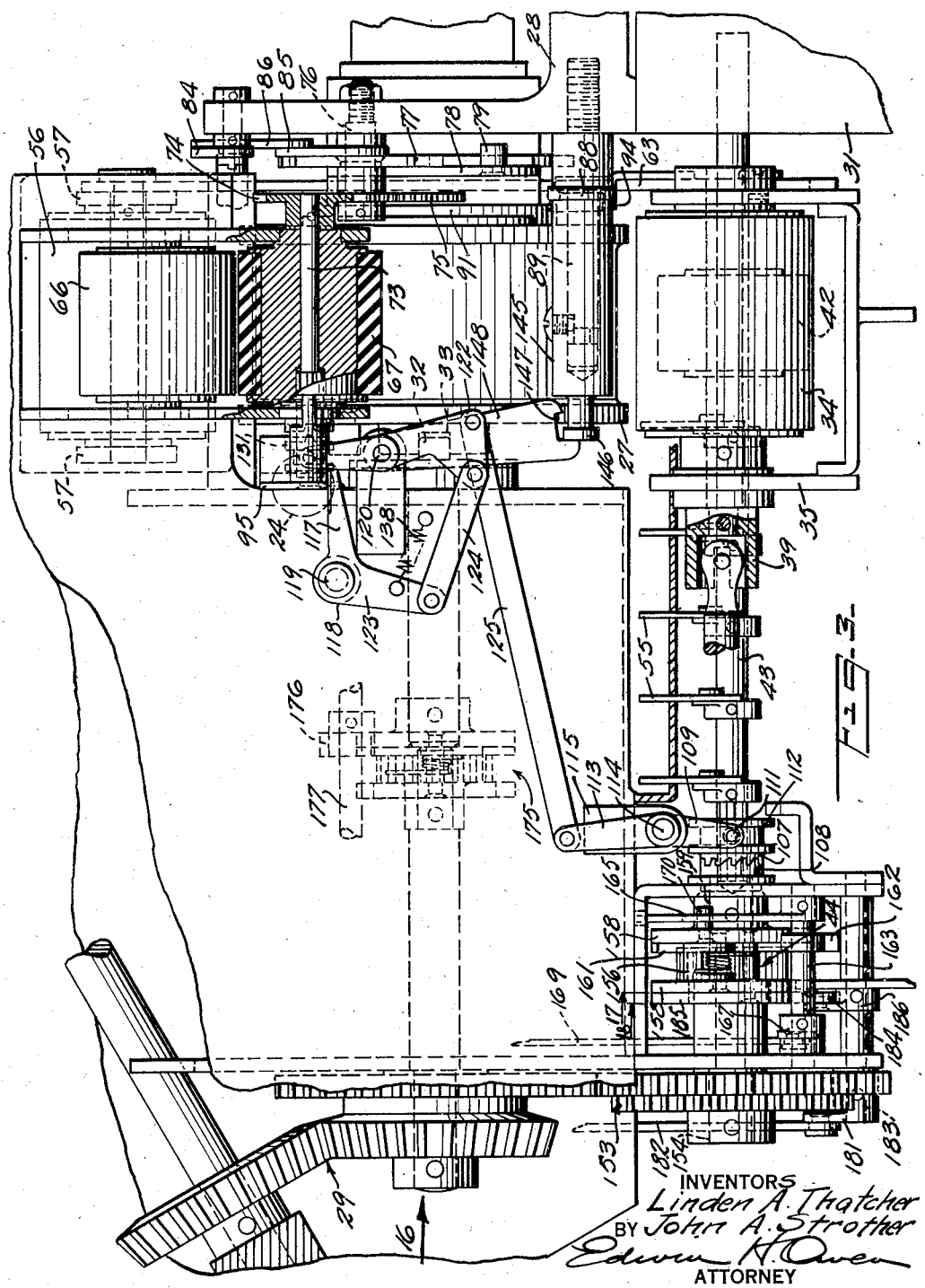
Fig. 3 is an elevational view looking in the direction of the arrow 3 on Fig. 2, with part in section.

Referring now to Figs. 2 and 3 in which the mechanism directly associated with this invention is shown in detail, a printing cylinder 27, having an indicia die 26, is carried by suitable support 28 and is adapted to be driven by means of a power drive indicated at 29. The support 28 forms a part of a unit which is carried by a bracket 31. The drive 29 is connected with the printing cylinder by means of a key and slot connection 32—33, Fig. 3, and is controlled by a clutch 175, in a manner to be hereinafter described, so as to be driven through one revolution whenever the machine is tripped, either through a letter tripping or manual tripping operation.

In connection with the letter tripping structure, a platen roller 34 is mounted in a bracket 35 which bracket is pivotally supported on a shaft 36, the shaft being supported by lugs 37 projecting inwardly from the front wall of the housing 15. Said platen roller 34 is further positioned so as to be normally urged toward the lower surface of the printing cylinder 27 by means of a spring 38, Fig. 6. Said platen roller 34 is also adapted to be driven by means of a flexible drive connection 39, which is connected with the power drive in a manner best shown in the aforesaid patent application.

Adjacent the letter slot 21, and inside the machine housing, are two rollers 41—42, which, when a letter is inserted in the machine, are adapted to feed said letter to a printing position. The roller 42 is positioned below the roller 41 and is carried on a shaft 43, which shaft is suitably supported and is adapted to be driven through one revolution by means of a clutch drive indicated at 44, in a manner to be hereinafter described.

The roller 41 is mounted on pivotal support arms 45, which arms are carried by a shaft 46. Said roller 41 is normally urged downwardly toward the roller 42 by means of a spring 47 but owing to the engagement of an arm 48, on shaft 46 with the end of another arm 49 carried by the shaft 43, the said roller 41 is normally maintained in a spaced apart relation with the roller 42.

A letter trip lever 51 is carried by a shaft 52, and when engaged by a letter L, as best shown in Fig. 8, a lever 171 will be rocked to effect release of the clutch mechanism 44 in a manner to be later described. Said letter tripping operation will effect rotation of the shaft 43 and thereby disengage the arm 49 from the arm 48, which in turn will permit the roller 41 to be forced downward into engagement with the letter and thereby effectively coact with the roller 42 to drive or feed the letter to a printing position. Upon completing one revolution, a roller 54, carried by the arm 49, will engage and cam the arm 48 upwardly to its original position, shown in Fig. 2. A series of fingers 55, carried by the shaft 43, normally lie in the path of the letter to provide a stop which is engageable by said letter when inserted in the machine. Said fingers will immediately be removed from the path of the letter after a letter tripping operation is effected.

Associated with the tape printing mechanism is a platen roller 56, which is carried by support arms 57, said arms being carried by a shaft 58. The shaft 58 is supported by lugs 59, fixed to the inner wall of the housing 15, and also has secured thereto an arm 61. By means of a spring cushion structure 62, the arm 61 and platen roller support arms 57 are normally urged in a counter-clockwise direction about the axis of shaft 58 to normally maintain the platen roller 56 in a spaced relation to the printing cylinder 27.

A link 63 has one end fixed to a platen roller supporting arm 57 and the opposite end loosely connected with the platen roller support bracket 35 by means of a pin and slot connection 64.

A roll of tape 65 is suitably mounted upon a shaft 70 and the free end of said tape passes between a pair of tape feed rollers 66—67 and between the cutters of a tape cutting device 68. Said tape feed roller 66 is mounted in bearings 69, which bearings are slidably mounted within a bracket 71, and further are normally urged in a downward direction by means of springs 72. The lower tape feed roller is mounted upon a shaft 73 carried by the bracket 71, which shaft further carries a gear 74 which meshes with a Geneva driven gear 75. Said Geneva driven gear is supported on a stud 76 and has secured thereto a Geneva wheel 77. An arm 78 is fixed to the printing cylinder 27 and has a pin 79 thereon, which, during the rotation of said printing cylinder is adapted to engage with one of four slots 80 in the Geneva wheel 77 to thereby rotate said Geneva wheel through 90 degrees during each revolution of the printing cylinder.

The tape cutting device 68 comprises a stationary cutting member 81 and a rotary cutting member 82, said rotary member having a slot therethrough coinciding with slotted portions at each side of the stationary knife and being rotatably mounted within the stationary knife structure 81. Said cutting device is supported on a bracket 83 suspended from a part of the machine frame. An arm 84 fixed to the rotary cutting knife 82 is connected with an arm 85 on shaft 76 by means of a link 86, said latter arm being freely mounted upon the shaft 76. After the pin 79 leaves the slot 80 of the Geneva wheel during the feeding of the tape, it will next engage the free end of the arm 85, as best shown in Fig. 10, to rock said arm about the shaft 76. This will effect the rocking of the rotary cutter 82 to cut a desired length of tape before printing occurs. After cutting, the cut strip of tape or stamp S will be supported within a guide member 87. The said cutter device is the same as the cutter disclosed in Patent No. 1,849,443, and any further detail may be had by reference to said patent.

Coinciding with the tape cutting operation, there is also provided means for effecting movement of the tape platen roller 56 in a downward direction to engage said cut portion of the tape while it is supported by the guide member 87. Downward movement of the platen roller 56 is accomplished by rocking an arm 88 about a stud 89, through the engagement of a cam 91 with a roller 92 on said arm 88, as best shown in Fig. 6. A roller 93 at the end of said arm 88 normally engages a lug 90 on the link 63. When said arm 88 is rocked, the roller 93 will force the lug 90 downward and consequently move the link 63, bracket 57 and platen roller 56. Upon the approach of the indicia die face 26 of said printing cylinder 27 to the position of the platen 56, the said cut stamp portion will be engaged by the printing die face and imprinted with the postage indicia and value, and further will be fed forwardly through a tubular guide 94, as indicated in Fig. 11. Upon passing through said tubular guide 94 the printed tape or stamp will rest in an accessible position within the stamp receptacle 19, as shown in Fig. 12.

The tripping of the machine to perform a stamp printing operation is accomplished by pressing the tape button 24, which button extends beyond the front wall of the housing 15. Extending inwardly from said button and secured thereto is a bar 95 which is slidably supported in walls 96—96, forming part of the frame structure. A pin 97 extends sidewardly from one side of the bar 95. A forked arm 98 is secured to the shaft 52, which shaft also carries the letter tripping finger 51. Engaged with the forked portion of said fork arm 98 is a pin 99 which extends sidewardly from an arm 101 on a shaft 102. Said shaft 102 is suitably carried in a bracket 103, and further has fixed thereon a lever 104, one arm of which extends in the path of the pin 97 on the trip bar 95. Upon moving said trip bar 95 inward by pressing the button 24, the pin 97 will engage the arm of said lever 104 to thereby rock same and shaft 102, which in turn will rock the arm 101 and forked arm 98, to finally effect the rocking of the shaft 52 and cause a tripping operation. See Fig. 4.

It will thus be seen that the tripping of the machine may be effected by either the engagement of a letter with the trip lever 51 or by pressing the button 24.

For the purpose of clarifying the drive of the letter feed and the printing cylinder, Figs. 16, 17 and 18 have been included, which show the means provided for effecting a tripping operation, to first release the letter feed drive, then release the printing cylinder drive.

Referring first to Fig. 16, a train of gears is shown at 153, which gears are driven from the aforementioned drive 29 and control the drive of a short shaft 154. Said drive 29 is rotated continuously after a coin is entered into the machine, therefore, the shaft 154 will be rotated continuously. The clutch 44, previously mentioned, is carried by the shaft 154. Said clutch is of the ratchet and pawl type, the ratchet portion 155 being continuously driven by the shaft 154. The pawls 156 are mounted on studs 157 which are supported between end plates 158. Said end plates 158 are carried by a stub shaft 159 which also carries the aforementioned clutch member 108. Said pawls 156—156 are urged against a cam plate 161, the cam plate being normally maintained in the position sown in Fig. 17, by a stop lever 162 fixed on a shaft 163. As long as the stop lever 162 is maintained in a stop position, the pawls 156 are held withdrawn from the ratchet wheel 155. When however, the stop lever 162 is withdrawn from its engagement with a finger 164 on said cam plate 161, the pawls move into engagement with the ratchet wheel 155 and are thereby driven until the clutch has rotated through one revolution. The hooked end of the lever 162 is returned to the path of the finger 164 when a lever 165 on said shaft 163 is rocked as a result of the engagement of a pin 170 therewith, which pin extends sidewardly from one of the end plates 158. The said pin 170 will engage the head portion 166 of said lever 165, to cam said lever outward.

The rocking of said shaft 163 is effected by means of the rocking action of a lever and link unit which comprises lever 167, lever 168 and link 169. On the shaft 52, which carries the letter trip finger 51, is a short lever 171, at the end of which is an upwardly disposed hook 172. When a letter is inserted in the machine and engages the trip finger 51, said lever 171 is rocked and the hooked member 172 is drawn downwardly against a projection 173 on lever 168. The lever 168 is thus rocked and consequently effects the rocking of the lever 167. This action rocks the shaft 163 and withdraws the hooked member 162 to trip the clutch 44.

Having thus tripped the clutch 44, the clutch member 108 will be driven to thereby effect the rotation of the shaft 43 and effect a letter feeding operation through the feed rollers 41 and 42.

A clutch 115, Fig. 3, which is similar in construction to the above named clutch 44, controls the drive of the printing cylinder 27, when tripped. Said tripping occurs immediately after the tripping of the clutch 44 in a manner now to be described. Referring to Fig. 16, a clutch stop 176 is mounted upon a shaft 177 and has its free end engaged with a finger 178 of the clutch member 175. Another lever 179, which is fixed to the shaft 177, is linked with a lever 181 by means of a link 182. Said lever 181 is fixed to a shaft 183, which shaft is adapted to be rocked by means of the engagement of a cam portion 185 of a disc 187 with a roller 184 on a lever 186. The disc 187 is carried by the clutch unit 44 and therefore will function to rock the lever 186 and shaft 183, immediately upon operation of said clutch 44. The rocking of said shaft 183 will effect the rocking of shaft 177 through the lever and link connections 181, 179 and 182 respectively, which in turn will effect the rocking of the clutch stop lever 176, and release the clutch 175. The release of said clutch 175 will effect the drive of the printing cylinder 77 through one revolution, there being an arm 188 on the shaft 177 which is engaged by a pin 189 to return the clutch stop in a manner similar to that described for the clutch 44.

It will now be shown how, when tripping is effected by either the insertion of a letter or the pressing of the button 24, interlocking mechanism will become effective in the locking of the mechanism which is not in operation.

Referring to Fig. 3, a clutch member 107 is shown slidably mounted upon a splined end portion of the shaft 43 and when engaged with the driven clutch portion 108, it will effect the drive of the feed roller 42 of the letter feed means, which feeding can only occur when a trip is effected by means of the engagement of a letter with the trip lever 51. When tripping of the machine is accomplished by pressing the button 24 for the printing of tape, the said clutch member 107 will be declutched from the driven member 108, thereby leaving the shaft 43 free from rotation and causing the fingers 55 to remain fixedly in the path of the letter. The shifting of said slidable clutch member 107 is accomplished by means of a shifting lever 109 which has a pin 111 engaged with a groove 112 in the clutch portion 107. Said lever 109 is fixed to one end of a shaft 114 carried in brackets 115—115, Fig. 2. Another lever 113 is mounted at the opposite end of the shaft 114.

Figure 4:
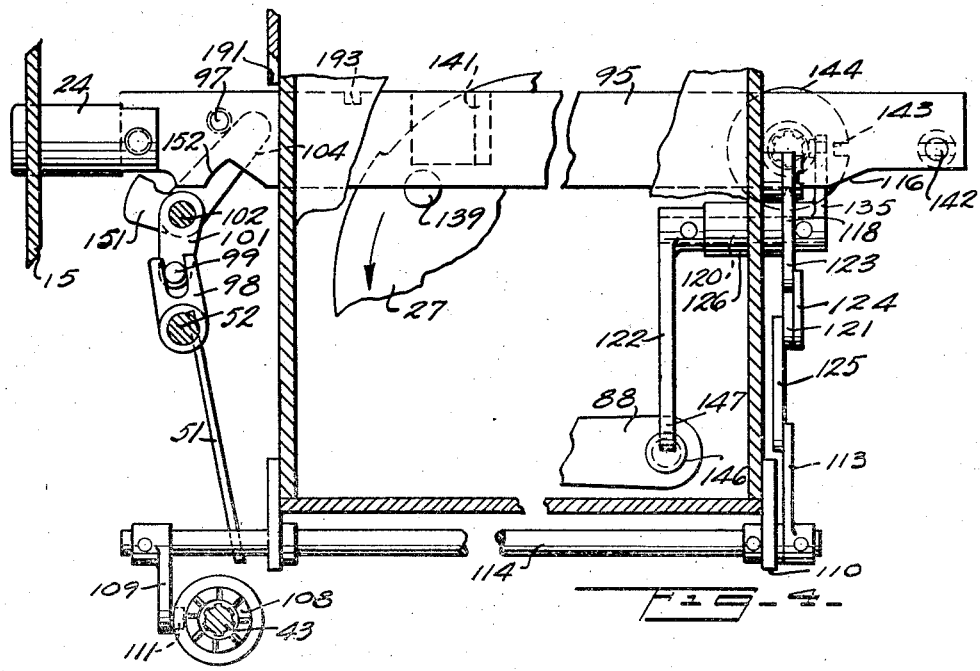
Fig. 4 is a detailed view showing the tape controlling push button moved to its inward or depressed position, and further shows the mechanism which is affected by the movement thereof.

At the inner end of the manually operated bar 95 is a cam portion 116, Fig. 4. When said bar is moved inward by pressing the button 24, the cam portion 116 will move across one arm 117, Fig. 5, of a lever 118 to rock said lever about its supporting stud 119. By means of compound linkage, best shown in Fig. 5, said lever 118 is connected with the clutch shifting lever 109. The parts of the linkage include, a lever 122 carred by a shaft 120, link 124 connecting an arm 123 of the lever 118 with the lever 122, and a link 125, connecting the lever 122 with the lever 113.

Figure 5:
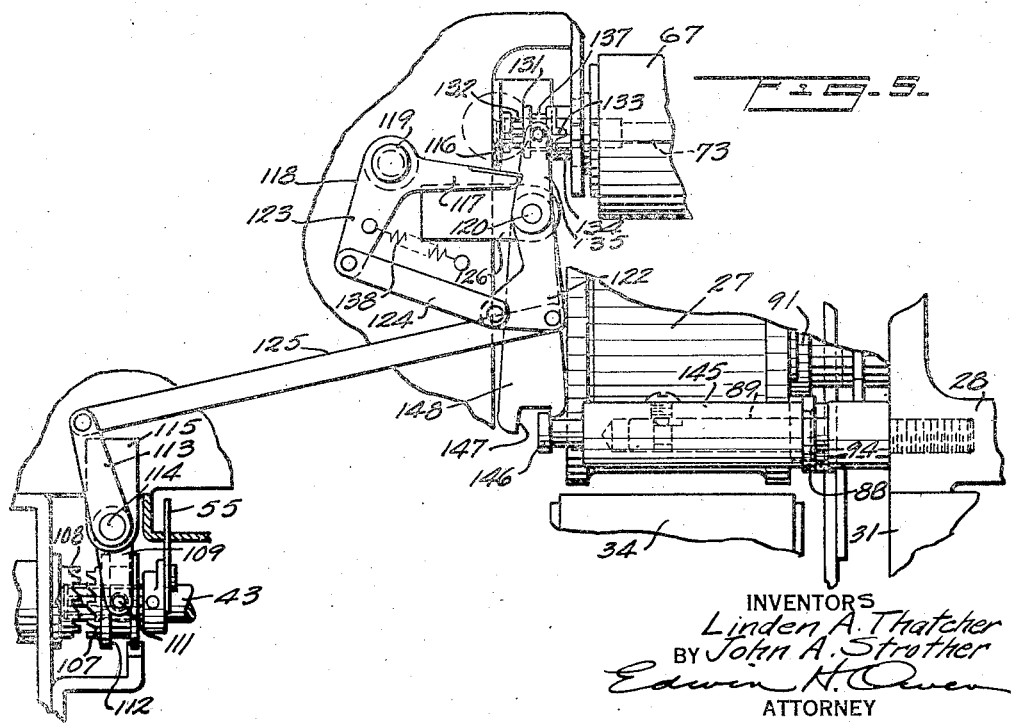
Fig. 5 is a detailed view of a part of the mechanism shown in Fig. 3, showing the position of the parts when the tape controlling push button is in the inner position of Fig. 4.

Referring to Fig. 5, it will now be seen that the rocking of the lever 118 by means of the cam portion 116, upon depressing the button 24, will effect the rocking of the lever 122 through link 124, which in turn will effect the rocking of the shift lever 109, through link 125. The result of the latter movement will effect the declutching of the clutch member 107 from engagement with the driven portion 108.

Clutching and declutching means is also provided for the drive of the tape feed roller 87. A sliding clutch member 131, is carried by the splined end 132 of the gear driven shaft 73, and is adapted to be shifted into or out of engagement with a slotted hub portion 134 of the tape feed roller 67 by means of a shifting lever 135 on shaft 120. When in an engaged position, as shown in Fig. 5, the roller 67 is adapted to be driven, but when disengaged, as in the position shown in Fig. 3, the drive to the feed roller 67 is broken. In other words when the drive of the letter feed mechanism is effective through the engagement of the clutch members 107 and 108, the clutch members 131 and 134 associated with the tape feed roller 67 are disengaged, and when the tape feeding mechanism is effective through the engagement of the clutch members 131 and 134, the clutch members 107 and 108 are disengaged.

The bar 95 is positively returned from its depressed position to the normal position of Fig. 2 by means of a pin 139 which extends sidewardly from the printing cylinder 27. At the end of each revolution of the printing cylinder 27, the pin 139 will engage with a lug 141 on the bar 95 to drive said bar forward. When the bar 95 returns to the normal position, shown in Fig. 2, the lever 118 will have been rocked about its pivot 119 through the action of a spring 138, Fig. 5. This action effects the rocking of the lever 122 and arm 135 and withdraws the clutch member 131 from engagement with the slotted hub 134.

A locking pin 142, provided at the inner end of the bar 95, is adapted to engage a slotted portion 143 of a flange 144 on the tape feed roller 67 to prevent rotation of the tape feed rollers unless the button 24 is depressed.

To prevent the accidental pushing of the tape control push button 24, a latch bar 191 is provided which is pivotally mounted on a stud 192 as shown in Fig. 19. One end of said latch bar is adapted to engage a notch 193 in the tape control push bar 95, when the push button is in its extended position as shown in Fig. 2, to thus latch the bar 95 against movement. The opposite end of the latch bar is adapted to engage a cam 194, which is rotatable with the selector dial 25. Upon rotation of the selector dial 25 by knob 18, to set a value in the value printing type, the cam 194 will rotate and rock the latch 191 out of engagement with the bar 95, after which the push button may be depressed.

Means is also provided, which, during the rocking of the clutch member actuating devices, will effect sliding movement of the arm 88 to thereby shift the roller 92 into or out of operative relation with its actuating cam member 91. Said means comprises a slidable sleeve 145, Fig. 3, which is slidably mounted on the stud 89, and which forms a part of the arm 88. At the end of said slidable sleeve 145 is a projecting flanged head 146 which is adapted to be engaged by a forked end 147 of an arm 148, fixed to the shaft 120. When the machine is set for a tape printing operation, the said forked end 147 will be in the position shown in Fig. 5. In this position the sleeve 145 is shown moved outwardly upon the stud 89 with the cam roller 92 in the path of the cam 91. When the machine is set for a letter printing operation as in Fig. 3, the sleeve 145 will have been moved by the forked end 147 to remove the cam roller 92 from the path of the cam member 91.

When tripping the machine by means of a letter, means is provided to prevent the depressing of the tape push button 24. Said means comprises a lock arm 151 fixed to the shaft 102 which arm is adapted to be rocked to the position shown in Fig. 8, into engagement with a slotted portion 152 of the bar 95. This action is effected when the letter L strikes the finger 51 and rocks the forked arm 98 and arm 101.

When the tape push button 24 is depressed, a letter cannot be inserted in the machine, because the clutch connections 108, 107, with the shaft 43 is broken. The fingers 55 therefore remain in the letter path and obstruct the passage of a letter.

In the operation of the above described machine, let us assume that an operator has five letters to mail, each of which will require a 3¢ stamp, and a parcel-post package which will require a 10¢ stamp. The operator will insert the required coin or coins amounting to the total of 25¢ within the coin slots 16 to effect the setting of a credit within the machine to the full value of the 25¢ or units, which amount will be registered on the dial 17. A selection is then made by means of the knob 18 by rotating same until the value of 3¢ appears within the window 22. Having made such selection, the machine is now ready for a printing operation on either letters or tape.

Each of the five letters is inserted within the letter slot 21 in succession to effect the tripping of the machine and the printing of the selected value and other indicia on letters. As each letter is passed through the letter slot it will engage the trip finger 51, Figs. 2 and 8, to thereby effect the tripping of the clutch 44, Figs. 3 and 17, also the tripping of the clutch 175, Figs. 3 and 16. The tripping of the clutch 44 will effect the release of letter feed roller 41 and rotation of the feed roller 42, which rollers will feed the letter to the printing cylinder. The tripping of the clutch 175 will effect the drive of said printing cylinder, which during its rotation will print and further feed the letter to a mail depositing position, as in Fig. 9.

Upon printing each of said letters, the credit which was set up, will be reduced 3¢ or units for each letter, thus leaving a balance of 10¢ or units after all of the letters have had the value stamp impression printed thereon.

Instead of printing a value stamp impression directly upon the parcel, as had previously been done upon the letters, the stamped impression is to be taken upon a piece of tape which is cut to a suitable length and deposited in the tape receiving receptacle 19. When taken from said receptacle, the tape is applied to the parcel, said tape having some suitable adhesive on the back thereof, such as a gummed surface.

Referring now to the tape printing operation, the operator will adjust the selector knob 18 to select the value of 10¢, which value will appear within the window 22. Having made such selection the operator will press the tape button 24, which will effect the tripping of the aforesaid clutch 44 through a connection with the trip finger supporting shaft 52, as indicated in Fig. 4, to thus trip the clutch 175 and start a tape feeding and printing operation.

During the rotation of the printing cylinder, the leading end of a strip of tape is fed to a printing position when a pin 79 which rotates with the printing cylinder engages a Geneva drive 77. This will effect the partial rotation of feed wheels 66—67 to feed the desired length of tape between the cutters 81, 82 of a tape cutting member. Upon feeding said desired length of tape, the pin 79 will next advance to the position shown in Fig. 10, where it will engage a part of the cutting member to effect movement of a rotary cutter and sever the extended end of the tape before printing occurs. Immediately after said severing operation the indicia printing die 26 will have made contact with the severed tape portion, as shown in Fig. 11, to thereby print and feed said cut tape portion. During said feeding operation the tape will pass through a guide tube 94, which will guide same into the tape receptacle 19.

Printing is effected at two different positions, at the top and bottom of the printing cylinder, for the purpose of feeding letters into the machine and tape out of the machine. One platen roller 34 is normally maintained in an operative position with relation to the printing cylinder for the printing of letters, and is adapted to be moved out of said printing position when a roller 92, Fig. 6 is in the path of a cam member 91, on the printing cylinder 27. When said latter condition occurs, the cam 91 will engage the roller 92 upon rotation of the printing cylinder and depress a lever 88, which, through a roller 93, will effect the depression of a link 63 to thereby move the tape platen roller 56 into operative printing position with relation to the printing cylinder. Control of the position of the roller 92 is had through the manipulation of the tape button 24, by mechanism best shown in Fig. 4.

Devices are also provided for preventing a letter feeding operation when printing upon tape and also to prevent a tape tripping operation when printing upon letters. In the first named instance, when the tape button is depressed, as in Fig. 4, a cam portion 116 at the inner end of the bar 95 will engage lever 117 of Fig. 5, which through the mechanism above described, will effect the declutching of the clutch member 107—108 to thereby break the drive to the feed roller shaft 43. When a letter is inserted in the machine to trip same, as in Fig. 8, the locking arm 151 will engage slot 152 in the bar 95 to prevent the tape button 24 from being depressed.

In addition to using tape as a convenience for applying a postage stamp impression to packages, the tape may be accepted as change. For example, if a person has a single letter to mail, which will require a 3¢ impression, and only has a 5¢ coin available, the balance of 2¢ may be received by accepting tape with the 2¢ value impression. Said tape or stamp may either be retained for future use in the same manner as any ordinary postage stamp or may be redeemed at its face value at any post office.

Having thus described the invention, what is claimed is:

1. In a postage printing and mailing machine, a casing enveloping said machine having a letter slot and a tape delivery opening therein, a mail receptacle within the casing, a printing cylinder, a drive to rotate said cylinder once during a printing cycle of operation, a platen roller associated with the printing cylinder and positioned so as to cooperate in the printing of letters which are inserted in the letter slot and direct same to the mail receptacle, a second platen roller cooperating with the printing cylinder in the printing of tape and in directing same to the tape delivery opening, and means operable upon initiating either a letter or a tape printing operation to limit the printing to either letters or tape during the one revolution of the printing cylinder.

2. In a postage printing and mailing machine, a casing enveloping said machine having a letter slot and a tape delivery opening therein, a mail receptacle within the casing, a printing cylinder, a drive to rotate said cylinder once during a printing cycle of operation, a platen roller associated with the printing cylinder and positioned at the lower surface of the printing cylinder to cooperate in the printing of letters which have been inserted in the letter slot and direct same to the mail receptacle, a second platen roller cooperating with the printing cylinder in the printing of tape and positioned at the upper surface of the printing cylinder to direct the tape outward to the tape delivery opening, and means controllable upon initiating either a letter or a tape printing operation to limit the printing to either letters or tape during the one revolution of the printing cylinder.

3. In a mailing machine, a printing member, means to feed letters to said printing member, means to feed tape to said printing member, a letter controlled trip, a manual trip, a clutch controlled drive member connected with said letter feeding means, a clutch controlled drive member connected with the tape feeding means, connections between said clutch controlled members, said connections being movable to effect alternative connection of said clutch members in accordance with the trip selected.

4. In a machine having a printing device adapted for printing impressions on letters or on tape, a printing cylinder, a drive for said printing cylinder, an adjustably mounted platen roller associated with the printing cylinder to effect printing on letters, an adjustably mounted platen roller associated with said printing cylinder to effect printing on tape, one of said platen rollers being normally in operative printing relation with the printing cylinder, manual tripping means to initiate a tape printing operation, tripping means to initiate a letter printing operation, said manual tripping means having a connection with both platen rollers, whereby said rollers may be simultaneously adjusted after the actuation of said manual tripping means to remove the one platen roller from its normal printing position and to move the other roller into printing position.

5. In a postage printing and mailing machine, a casing enveloping said machine having a letter slot and tape delivery opening therein, a mail receptacle within the casing, a printing cylinder, a drive to rotate said cylinder during a printing cycle of operation, means operatively associated with the printing cylinder to effect the printing and directing of letters to the mail receptacle within the casing, means operatively associated with the printing cylinder to effect the printing and directing of the tape from within the casing to the tape delivery opening, a trip member associated with letter printing, a trip member associated with tape printing, and means controllable upon initiating either a letter or a tape printing operation to limit the printing to either letters or tape during a printing cycle of operation.

6. In a machine of the class described, a printing member, means to guide letters for printing by said printing member, means to guide tape for printing by said printing member, a tripping device to effect the operation of the printing member to print on letters, a tripping device to effect the operation of the printing member to print on tape, and means operable under the control of the tape tripping device to prevent the passage of letters along the letter guide when tripping is effected.

7. In a machine of the class described, a printing member, means to direct tape to the printing member, a tripping device and means controlled thereby for effecting the movement of tape to the printing member, a second tripping device including means controlled thereby for effecting the movement of letters to the printing member, means controlled by the tripping device which is associated with the letter to prevent the movement of the tape to a printing position, and means controlled by the tripping device which is associated with the tape to prevent movement of the letters to a printing position.

8. In a machine of the class described, a printing member, means to guide letters for printing by said printing member, means to guide tape for printing by said printing member, a tripping device to effect the operation of the printing member to print on letters, a tripping device to effect the operation of the printing member to print on tape, and means operable under control of the letter tripping device to prevent operation of the tape trip when letter tripping is effected.

LINDEN A. THATCHER.
JOHN A. STROTHER.